Patented July 18, 1933

1,919,025

UNITED STATES PATENT OFFICE

CARL H. JONES, OF OAK PARK, AND WILBUR H. KRETLOW, OF CHICAGO, ILLINOIS, ASSIGNORS TO WM. J. STANGE CO., OF CHICAGO, ILLINOIS, A CORPORATION OF ILLINOIS

METHOD AND MATERIAL FOR APPLYING WATER SOLUBLE COLORS TO FATTY FOODSTUFFS

No Drawing.   Application filed December 17, 1931.   Serial No. 581,768.

Our invention contemplates and provides a method and material whereby we are enabled successfully to introduce water soluble colors into fatty foodstuffs such for instance as cake icings and confection coatings containing a large proportion of fats and oils.

It happens that the food colors generally most satisfactory are those which are soluble in water but not soluble in fats and oils. Examples of such water soluble food colors are tartrazine, sunset yellow, amaranth, ponceau 3R, erythrosine, and orange 1. Heretofore all attempts to use such water soluble food colors in fatty foodstuffs such as cake icings and confection coatings containing much fat have been unsatisfactory, because of spotty and other non-pleasing color effects directly attributable to the fact that such food colors are not soluble in fats and oils.

In preparing the material of the present invention, we add two (2) to ten (10) parts, by weight, of pure beeswax to one hundred (100) parts of anhydrous lanolin, and place this mixture in a receptacle wherein it may be heated.

In a separate receptacle we then add the selected water soluble food color or colors to an amount of water equal in weight to from fifty per cent (50%) to ninety per cent (90%) of the weight of the aforesaid mixture of lanolin and beeswax.

Heat is then applied to the two receptacles, the mixture of lanolin and beeswax being thoroughly melted, and the water, with the food colors added thereto as aforesaid, being heated almost but preferably not quite to its boiling point.

The heated water, with the food color in solution, then is slowly added to the melted mixture of lanolin and beeswax, while agitating the last mentioned mixture. The agitation of the lanolin and beeswax preferably is accomplished by rapidly rotating blades operating beneath the surface of the melted lanolin and beeswax, so that no appreciable amount of air is introduced into the mix by the rotating blades.

After the introduction of the water and colors into the lanolin and beeswax, and while the resulting mixture is still warm (i. e. having a temperature from 130 degrees F. to 150 degrees F.), and while continuing the agitation, we add castor oil of a weight equal to from ten per cent (10%) to twenty per cent (20%) of the combined weight of the lanolin, beeswax, water and colors. The agitation, by means of blades operating beneath the surface of the material being treated, is continued until the temperature of the said material reaches or closely approaches room temperature. The composition which the present invention contemplates then is realized.

This composition may be used in making fatty foodstuffs, such as cake icings and confection coatings, with the assurance that the water soluble colors, introduced into the said fatty foodstuffs with and as part of the composition of our invention, will be evenly distributed, and of excellent appearance, without there being any tendency for the water soluble colors to spot the fatty foodstuffs as heretofore always has been the case when attempts have been made to color fatty and oily foodstuffs with water soluble food colors such as those hereinbefore enumerated.

Our invention takes advantage of the capacity of anhydrous lanolin to take unto itself a surprising quantity of an aqueous solution of water soluble food colors, which aqueous solution remains evenly distributed within and throughout the lanolin as and when the composition of our invention is introduced into and becomes part of fatty and oily foodstuffs, such as cake icings, confection coatings, etc.

The beeswax lends the composition of our invention the body and stability which we deem desirable when the material is handled and sold commercially. The castor oil makes the material smooth, keeps it soft and gives it a pleasant gloss.

Having thus described the composition of our invention and having set forth the preferred method of making the same, what we claim is new and desire to secure by Letters Patent of the United States is:

1. A composition for use in making and coloring fatty foodstuffs, said composition including lanolin, a water soluble food color and water.

2. A composition for use in making and coloring fatty foodstuffs, said composition comprising lanolin, beeswax, a water soluble food color and water.

3. A composition for use in making and coloring fatty foodstuffs, said composition consisting of a homogeneous and uniformly colored mixture of lanolin, a water soluble food color and water.

4. A composition for use in making and coloring fatty foodstuffs, said composition comprising lanolin, beeswax, castor oil, a water soluble food color and water.

5. The method of making a composition wherewith to make fatty foodstuffs which consists in thoroughly mixing an aqueous solution of a water soluble food color with lanolin devoid of its normal water content.

6. The method of making a composition of the character and for the purpose described which consists in thoroughly mixing an aqueous solution of a water soluble color with a mixture of beeswax and lanolin devoid of its normal water content.

7. The method of making a composition of the character and for the purpose set forth which consists in adding a warm aqueous solution of a water soluble color to melted anhydrous lanolin while agitating the latter.

8. The method of making a composition of the character and for the purpose set forth which consists in adding a warm aqueous solution of a water soluble color to melted anhydrous lanolin while agitating the latter beneath its surface.

9. A composition for making and coloring fatty foodstuffs, said composition consisting of lanolin and an aqueous solution of a water soluble color replacing the normal water content of the lanolin.

10. A composition for making and coloring fatty foodstuffs, said composition consisting of beeswax and lanolin and an aqueous solution of a water soluble color replacing the normal water content of the lanolin.

11. A composition for making and coloring fatty foodstuffs consisting of beeswax, castor oil, lanolin and an aqueous solution of a water soluble color replacing the normal water content of the lanolin.

CARL H. JONES.
WILBUR H. KRETLOW.